US012421707B2

(12) United States Patent
Cho

(10) Patent No.: US 12,421,707 B2
(45) Date of Patent: Sep. 23, 2025

(54) NOZZLE DRIVE DEVICE FOR BIDET

(71) Applicant: IZEN CO., LTD., Gimpo-si (KR)

(72) Inventor: Jung Han Cho, Seoul (KR)

(73) Assignee: IZEN CO., LTD., Gimpo-si (KR)

( * ) Notice: Subject to any disclaimer, the term of this patent is extended or adjusted under 35 U.S.C. 154(b) by 327 days.

(21) Appl. No.: 18/081,805

(22) Filed: Dec. 15, 2022

(65) Prior Publication Data

US 2024/0151019 A1 May 9, 2024

(30) Foreign Application Priority Data

Nov. 4, 2022 (KR) ........................ 10-2022-0146211

(51) Int. Cl.
*E03D 9/08* (2006.01)
*A47K 7/08* (2006.01)
*B05B 15/70* (2018.01)

(52) U.S. Cl.
CPC .................. *E03D 9/08* (2013.01); *A47K 7/08* (2013.01); *B05B 15/70* (2018.02)

(58) Field of Classification Search
CPC .................. E03D 9/08; A61H 33/6031; A61H 33/6057–6063
See application file for complete search history.

(56) References Cited

U.S. PATENT DOCUMENTS 4,628,548 A * 12/1986 Kurosawa .............. G05B 19/40 4/443
6,754,912 B1 * 6/2004 Hayashi .................... E03D 9/08 239/468
10,604,923 B2 * 3/2020 Lee ........................... E03D 9/08
2016/0215489 A1 * 7/2016 Kim .......................... E03D 9/08

FOREIGN PATENT DOCUMENTS

KR 20-0363500 B1 10/2004
KR 20-0372461 B1 1/2005
KR 10-2018-0014601 A 2/2018
KR 20180014601 * 2/2018 ............... E03D 9/08

OTHER PUBLICATIONS

Commutation of Office Action of Korean Patent Application No. 10-2022-0146211 mailed on Feb. 28, 2024, which corresponds to this patent application.

* cited by examiner

*Primary Examiner* — David P Angwin
*Assistant Examiner* — Nicholas A Ros
(74) *Attorney, Agent, or Firm* — Goldilocks Zone IP Law

(57) ABSTRACT

Disclosed is a nozzle drive device for a bidet, the device including: a nozzle cover mounted on a water supply part to which a water supply source is connected; a nozzle fixing part coupled to an inside of the nozzle cover; an extended nozzle part slidably coupled to an inside of the nozzle fixing part and simultaneously communicating with a base end of the nozzle cover and a front end of the nozzle cover; a spray nozzle part coupled to the inside of the extended nozzle part to be slidably movable toward an upper end portion, and having at least one spray hole connected to the water supply part so as to spray wash water to an outside; and a driving part having a wound member coupled to an outside of the nozzle cover, the wound member being rotated so as to draw and insert the extended nozzle part and the spray nozzle part in multiple stages.

5 Claims, 9 Drawing Sheets

[FIG.1]
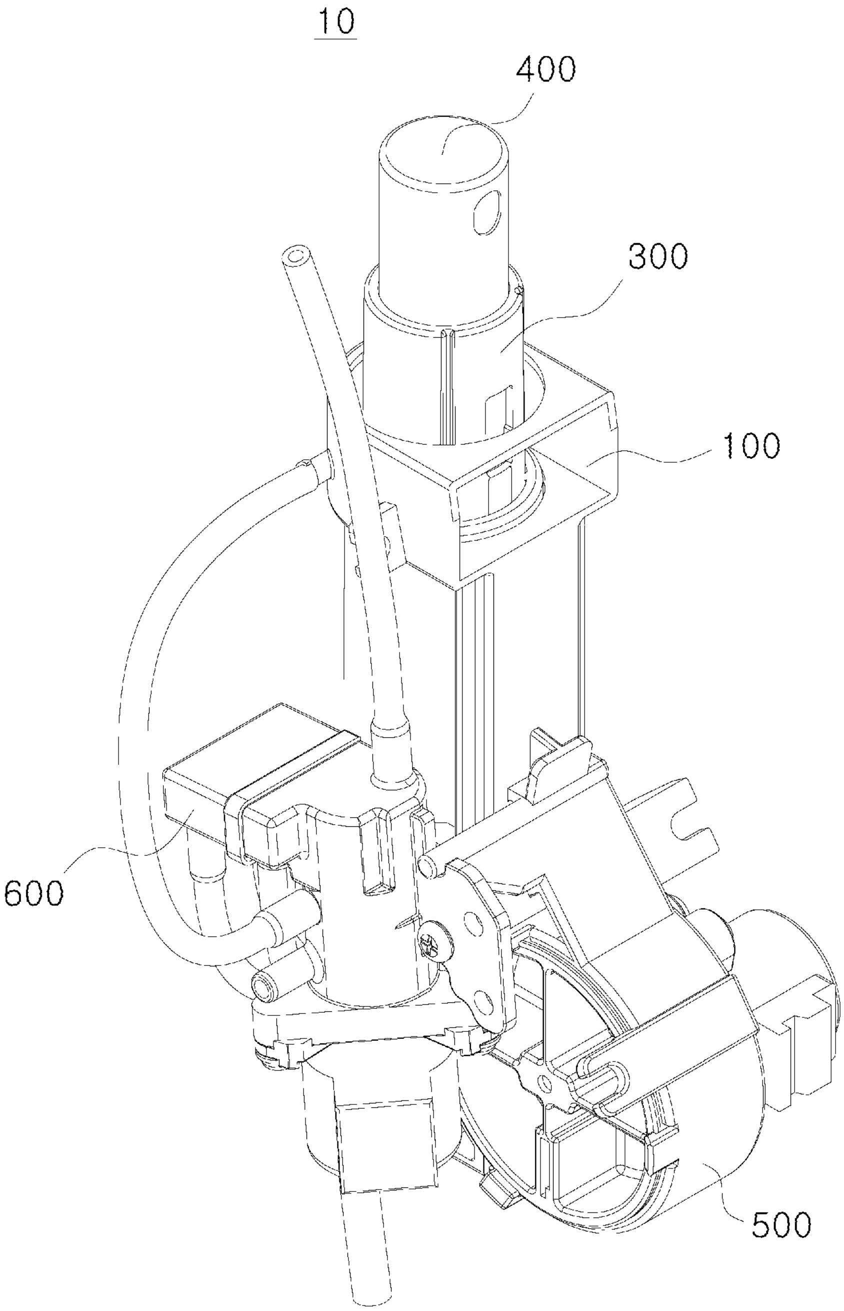

[FIG.2]
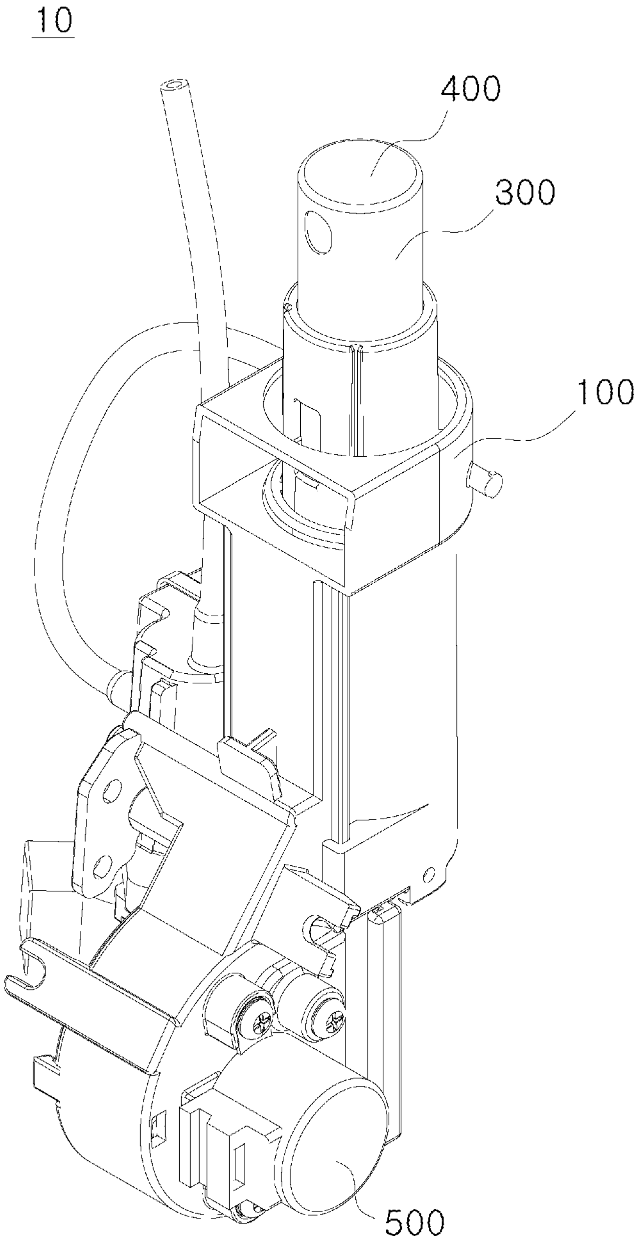

[FIG.3]
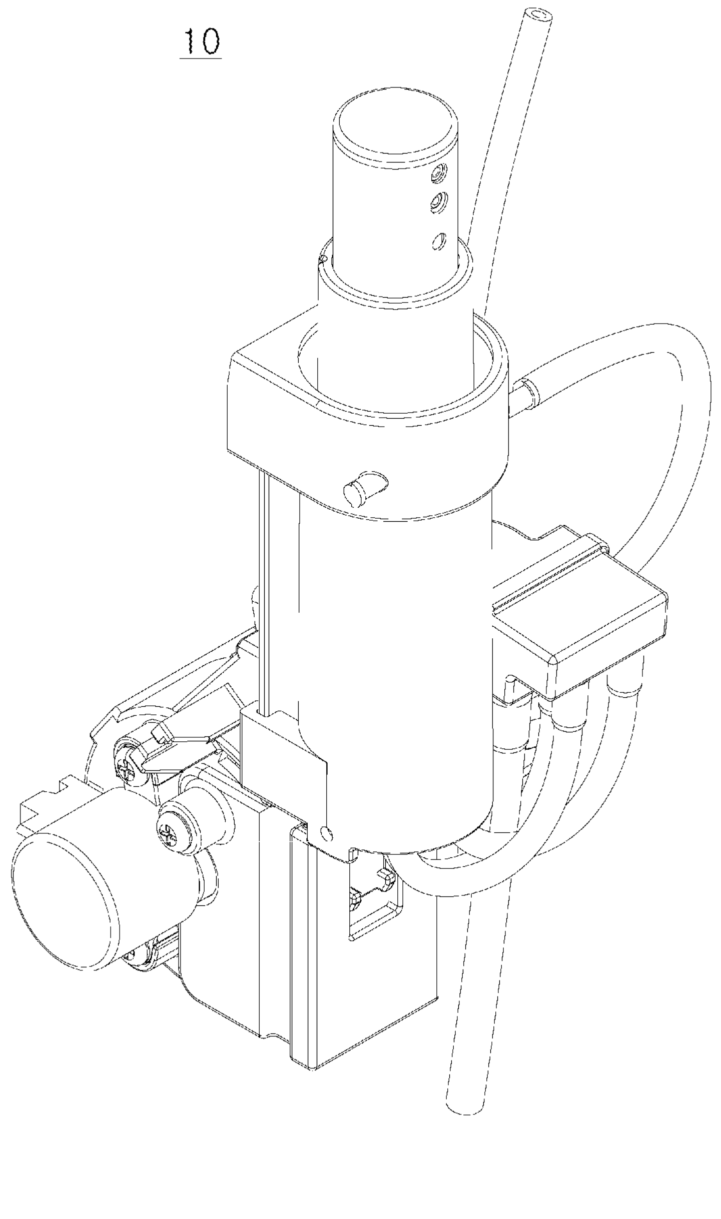

[FIG.4]
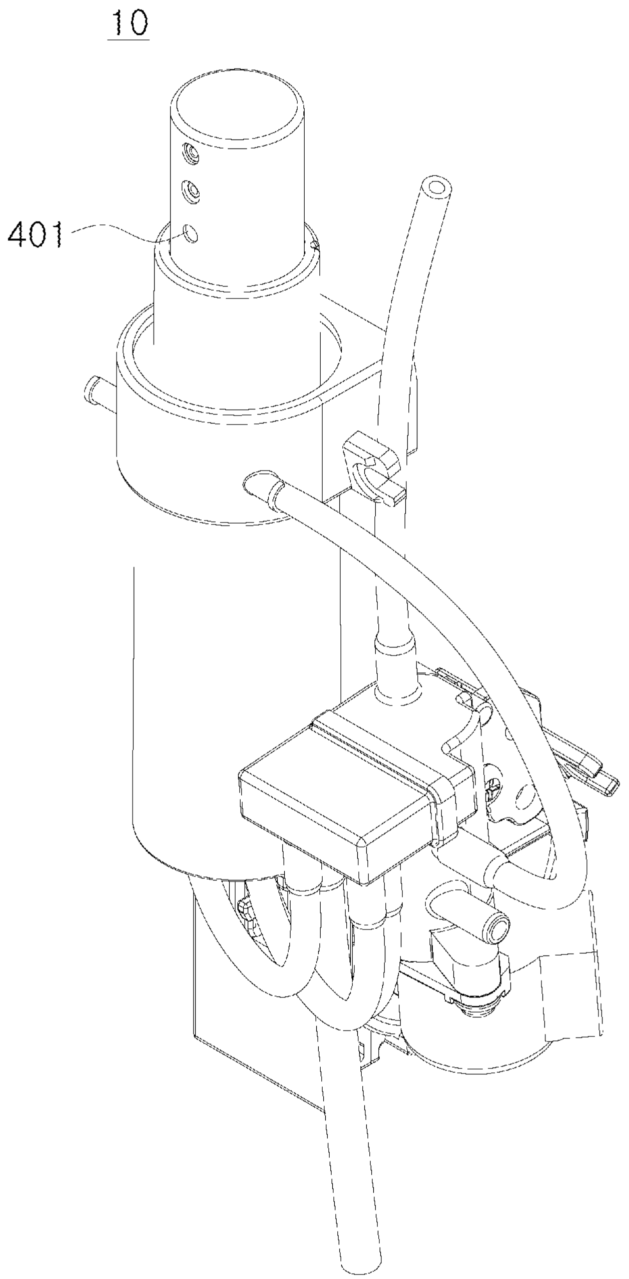

[FIG.5]
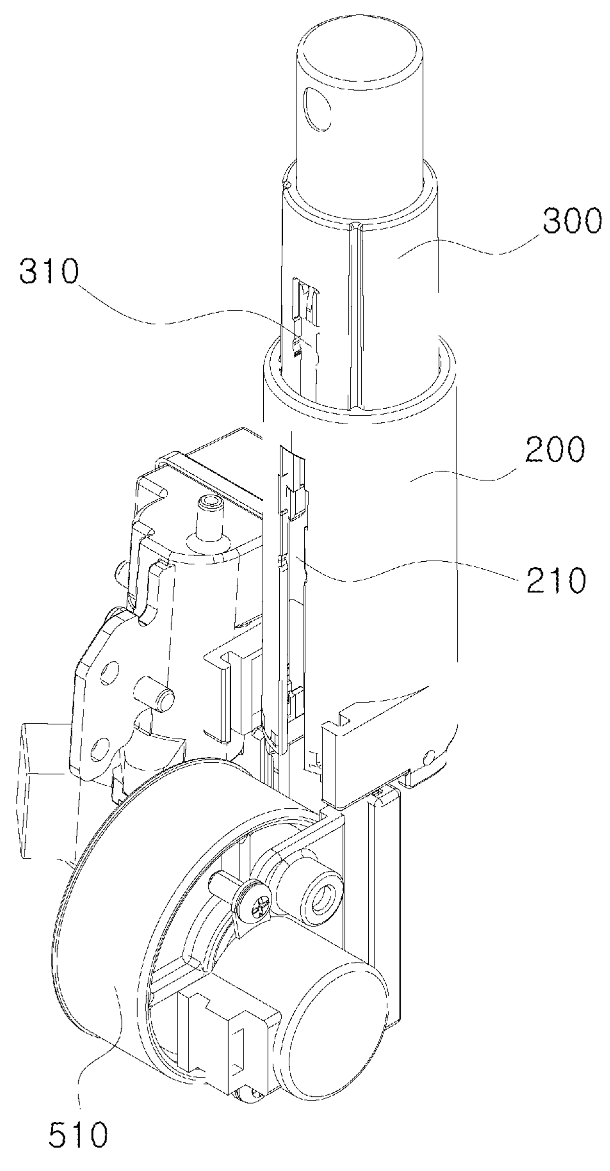

[FIG.6]
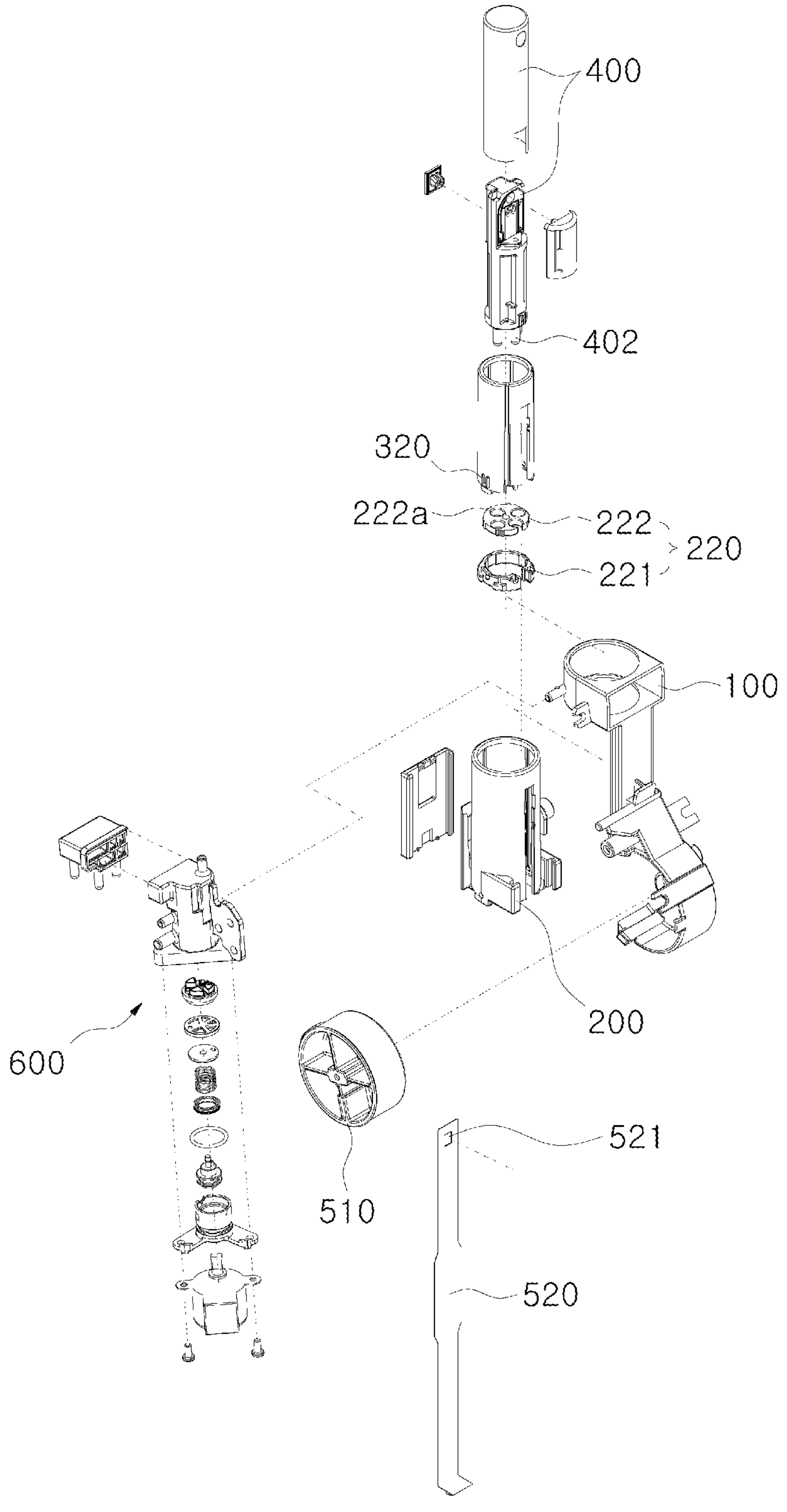

[FIG.7]
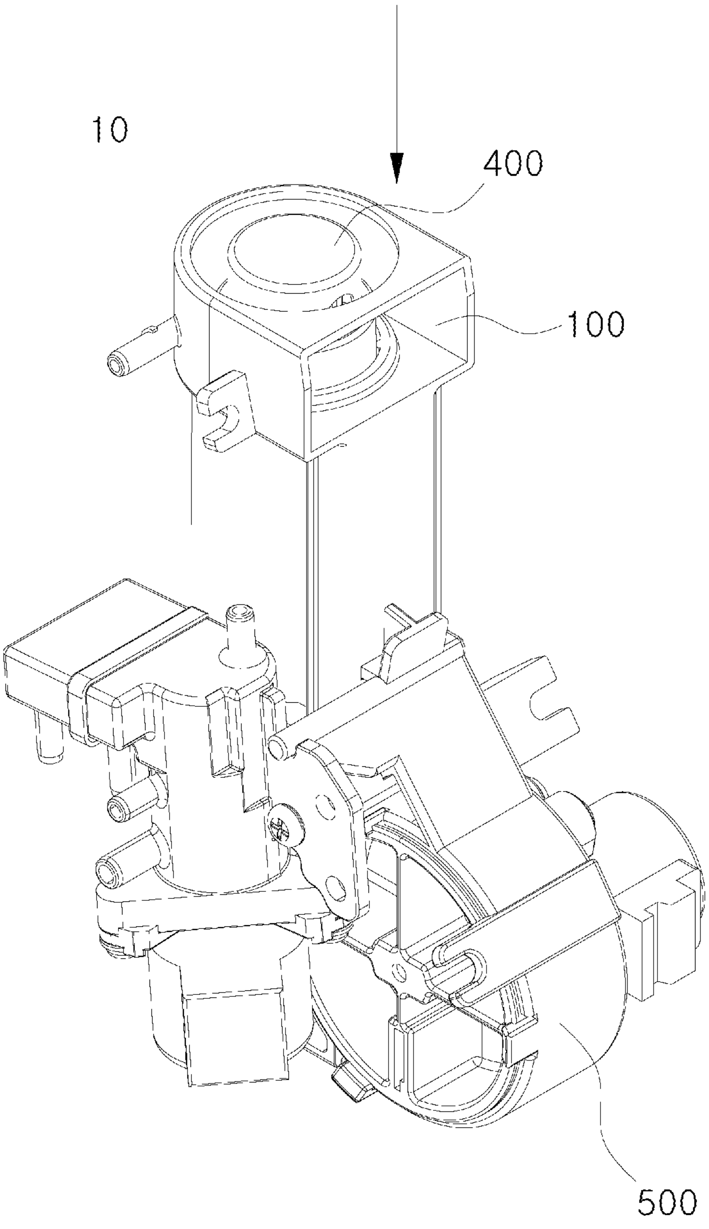

[FIG.8]
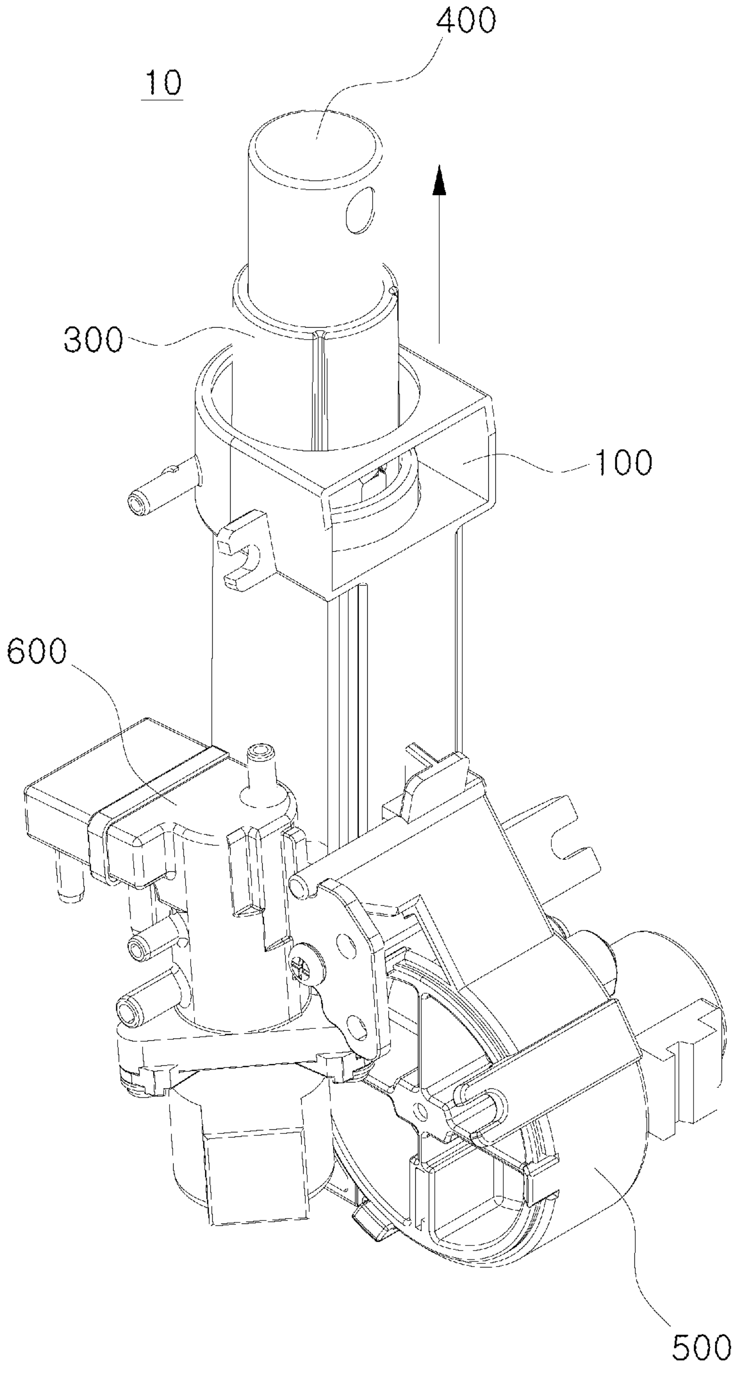

[FIG.9]
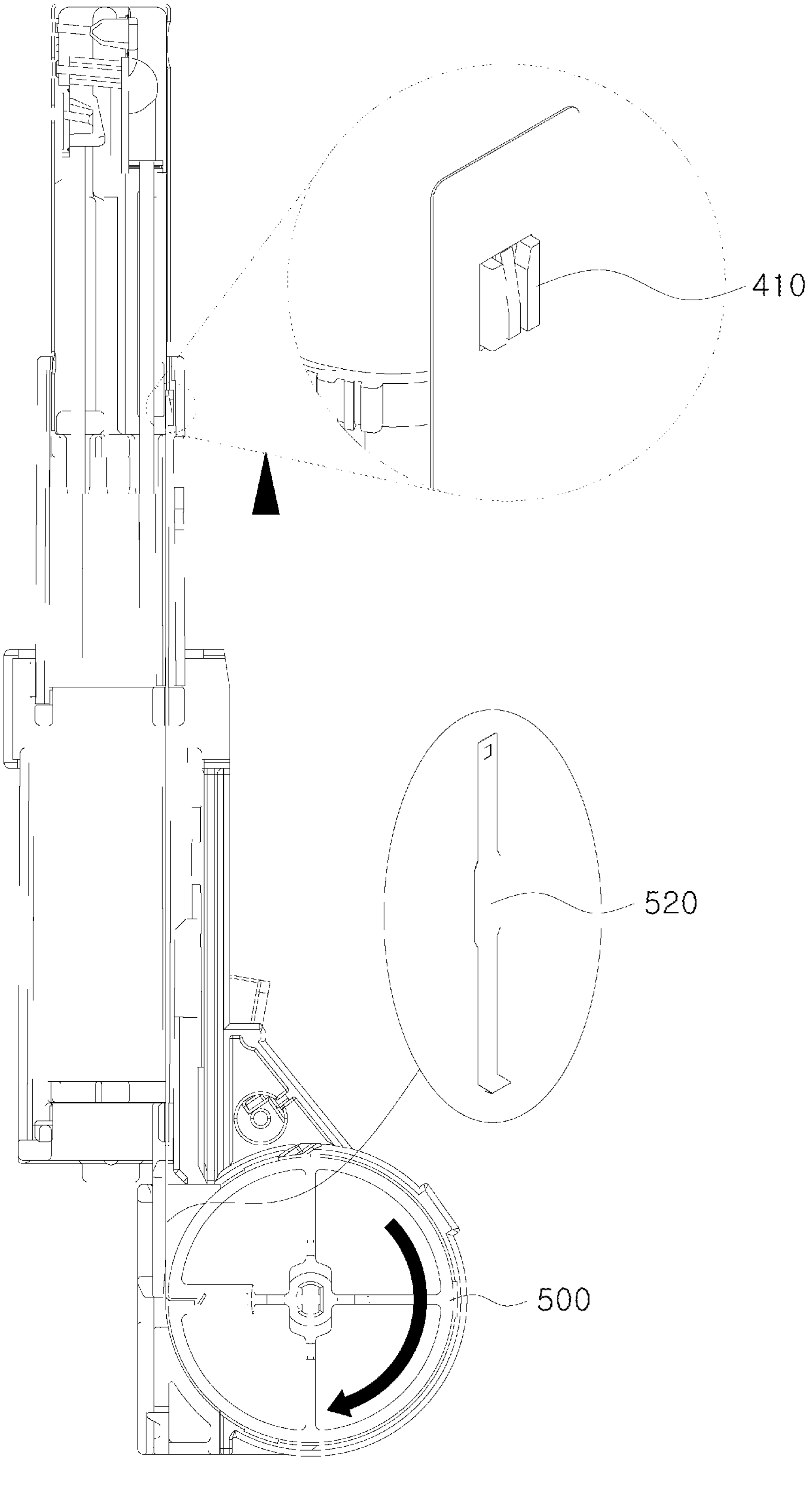

NOZZLE DRIVE DEVICE FOR BIDET

CROSS-REFERENCE TO RELATED APPLICATIONS

This application claims the priority to Korean Patent Application No. KR10-2022-0146211, filed on Nov. 4, 2022, in the Korean Intellectual Property Office, the disclosure of which is hereby incorporated by reference in its entirety.

BACKGROUND OF INVENTION

Field of the Invention

The present disclosure relates to a nozzle drive device for a bidet, and more particularly, a nozzle driving device for a bidet, the device which is capable of adjusting a position of a spray nozzle according to a user's position when the user is seated, that is, a pressurized location, and which is capable of accurately varying a location where to spray wash water even if the user's seated position changes.

Related Art

In general, a bidet is a device designed to clean or massage one's genitalia, perineum, inner buttocks, and anus with wash water sprayed from a spray nozzle without using hands after defecation. In addition, the bidet is used to soothe hemorrhoids, cystitis, vaginitis, and soreness caused by diarrhea, and is also used during women's menstrual and postpartum care. Recently, for better personal hygiene, the bidet has become more widely used.

The bidet is usually seated in a toilet seat, filters water supplied from a tap, and stores the water in a water tank. After defecation, according to pressurization of a wash button, the bidet washes one's anus or genitals with the wash water sprayed through the spray nozzle from the water tank. After washing, the spraying of the wash water through the spray nozzle is stopped according to pressurization of the stop button, and residual water around the anus or genitals is dried according to pressurization of the dry button.

However, the pressure of wash water for washing the anus is not enough to allow the water to enter into the intestine through the anus, so there is a limitation in stimulating the sphincter muscles of a user with constipation to defecate.

In order to address the drawback, the Applicant of the present disclosure has registered Korean Utility Model Registration No. 20-0363500 which relates to a spray nozzle structure for a bidet with an enema function.

In this utility model registration, upon pressurization of an enema button, wash water stored in a water tank is sprayed through an enema spray hole under the control of a controller, and the wash water sprayed through the enema spray hole stimulates the user's anus and rectum, helping produce a bowel movement.

However, the wash water sprayed through the enema spray hole is not sprayed linearly but spreads, thereby failing to accurately stimulate the user's anus. Thus, the effect of the enema function may be reduced. In addition, areas other than the anus may be hit by the wash water, causing discomfort.

In order to solve the above problems, the Applicant of the present disclosure has registered Korean Utility Model Registration No. 20-0372461 which relates to a spray cap structure of a bidet spray nozzle.

In this utility model, when wash water stored in a water stank is sprayed through an enema spray hole under the control of a controller according to pressurization of an enema button, the wash water is sprayed linearly, not spreading, through the enema spray hole, by a guide rib formed at an end of the enema spray hole, thereby improving anal cleansing and enema function.

However, in the aforementioned utility model, despite the improved enema function, there is a problem that wash water is wasted because as a large amount of wash water is required for perfect washing, considering that the wash water sprayed from the bidet and the enema spray hole collides with the anus or the genitals in a narrow area.

In addition, since the wash water sprayed from the bidet and the enema spray hole is sprayed linearly, a less cleaning efficiency is achieved compared to when the wash water is sprayed in a spreading fashion, and the user's selection is limited due to simple functions.

In addition to the above problems, if a user's seating position changes each time the bidet is used or if the user is a person (e.g., children, the elderly, etc.) who may reposition when seated, it is not possible to accurately spray wash water to the anus or genitals, thereby resulting in less accuracy of the cleaning.

In order to solve the above problems, a technique for adjusting the front and rear position of the nozzle has been introduced. However, since this related art is limited to driving only the front and rear position of the washing nozzle, it is difficult to accurately adjust where to spray wash water from the washing nozzle and it is a hassle for the user to adjust the position of the washing nozzle on his or her own.

RELATED DOCUMENT

Patent Document

Patent Document 1: Korean Utility Model Registration No. 20-0363500

SUMMARY

The present disclosure provides a nozzle drive device for a bidet, the device which positions a washing nozzle according to a pressurized portion when a user is seated, so that a location where to spray wash water can be accurately varied even if the user's seated position changes, thereby avoiding cumbersome of re-adjusting the position of the washing nozzle and accurately cleaning the user's anus or gentiles.

Objects to be achieved by the present disclosure are not limited to the object mentioned above, and other objects not mentioned will be clearly understood by those skilled in the art from the description below.

In one aspect, there is provided a nozzle drive device for a bidet, and the device includes: a nozzle cover mounted on a water supply part to which a water supply source is connected; a nozzle fixing part coupled to an inside of the nozzle cover; an extended nozzle part slidably coupled to an inside of the nozzle fixing part and simultaneously communicating with a base end of the nozzle cover and a front end of the nozzle cover; a spray nozzle part coupled to the inside of the extended nozzle part to be slidably movable toward an upper end portion, and having at least one spray hole connected to the water supply part so as to spray wash water to an outside; and a driving part having a wound member coupled to an outside of the nozzle cover, the wound member being rotated so as to draw and insert the extended nozzle part and the spray nozzle part in multiple stages.

The nozzle fixing part may be formed with an incision groove in which a part of a surface is incised along a vertical length, and the nozzle fixing part may include a fixing member having a groove corresponding to the incision groove and fixing the extended nozzle part and the spray nozzle part.

The fixing member may include: a first fixing member to which a lower end of the extended nozzle part is coupled; and a second fixing member to which a lower end of the spray nozzle part is coupled. The first fixing member may be formed with a coupling protrusion so as to be engaged and coupled to the inside of the second fixing member, and a protruding protrusion protruding from a lower surface of the spray nozzle part toward the extended nozzle part is inserted into a corresponding groove corresponding to the protruding protrusion. The second fixing member may be formed with an insertion hole into which the coupling protrusion is inserted. The lower end of the spray nozzle may be inserted into the groove formed in an outer circumference of the second fixing member.

In the extended nozzle part, the corresponding incision groove corresponding to the incision groove of the nozzle fixing part may be formed, and a sliding protrusion may be provided at a lower end of an outer circumference of the extended nozzle part so as to slide along a vertical groove.

The spray nozzle part may include a moving protrusion protruding from an outer circumferential surface of the lower end of the spray nozzle part, and the moving protrusion may slide along the incision groove and the corresponding incision groove.

The wound member may have a plate spring wound inside. One side of the plate spring may be formed with a hole so as to be coupled to the moving protrusion, and the other side of the plate spring may be partially wound inside the wound member.

The nozzle drive device may further include a flow rate regulating valve coupled to the water supply part to regulate a flow rate.

As described above, in the present disclosure, it is possible to position a washing nozzle according to a pressurized portion when a user is seated, so that a location where to spray wash water can be varied even if the user's seated position changes, thereby avoiding cumbersome of re-adjusting the position of the washing nozzle and accurately cleaning the user's anus or genitles.

In addition, as each of a bidet nozzle and a washing nozzle has a three-stage structure so that they can be supported with a single support structure, the overall size of a bidet structure may be significantly reduced, thereby easily securing a space in a toilet and facilitating installation of the bidet.

Effects of the present disclosure are not limited to the effects mentioned above, and other effects not mentioned will be clearly understood by those skilled in the art from the description below.

BRIEF DESCRIPTION OF THE DRAWINGS

FIG. 1 is a view showing a seating portion of a nozzle drive device for a bidet according to an embodiment of the present disclosure.

FIGS. 2 to 4 are views showing various angles of the nozzle drive device for a bidet of FIG. 1.

FIG. 5 is a view showing a state in which a nozzle cover is removed from a nozzle drive device for a bidet according to an embodiment of the present disclosure.

FIG. 6 is an exploded perspective view of a nozzle drive device for a bidet according to an embodiment of the present disclosure.

FIG. 7 is a view showing a state in which an extended nozzle part of the nozzle drive device for a bidet are inserted into a nozzle fixing part according to an embodiment of the present disclosure.

FIG. 8 is a view showing a state in which a three-stage nozzle of a nozzle drive device for a bidet is withdrawn according to an embodiment of the present disclosure.

FIG. 9 is a view showing a moving protrusion of a nozzle drive device for a bidet according to an embodiment of the present disclosure.

DESCRIPTION OF EXEMPLARY EMBODIMENTS

The present disclosure can be modified and changed in various ways and can be embodied in various forms, and thus, the present disclosure will now be described in detail with reference to the accompanying drawings, in which exemplary embodiments of the present disclosure are illustrated.

However, it should be noted that the present disclosure is not limited to the exemplary embodiments, but all modifications, equivalents, or substitutes within the spirit and scope of the present disclosure will be construed as being included in the present disclosure. Like reference numerals have been used for like elements throughout the description of each drawing.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the present disclosure. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereinafter, embodiments of the present disclosure will be described with reference to the accompanying drawings. Like reference numerals in each drawing indicate like elements. In the course of the description of the present disclosure, the detailed descriptions on the related functions or construction will be omitted in order to prevent the subject matters of the present disclosure from becoming ambiguous.

FIG. 1 is a view showing a seating portion of a nozzle drive device for a bidet according to an embodiment of the present disclosure; FIGS. 2 to 4 are views showing various angles of the nuzzle drive device for a bidet of FIG. 1; FIG. 5 is a view showing a state in which a nozzle cover is removed from a nozzle drive device for a bidet according to an embodiment of the present disclosure; FIG. 6 is an exploded perspective view of a nozzle drive device for a bidet according to an embodiment of the present disclosure; FIG. 7 is a view showing a state in which an extended nozzle part of the nozzle drive device for a bidet are inserted into the nozzle fixing part according to an embodiment of the present disclosure; FIG. 8 is a view showing a state in which a three-stage nozzle of a nozzle drive device for a bidet is withdrawn according to an embodiment of the present disclosure; and FIG. 9 is a view showing a moving protrusion of a nozzle drive device for a bidet according to an embodiment of the present disclosure.

Referring to FIGS. 1 to 9, a nozzle drive device 10 for a bidet includes a nozzle cover 100, a nozzle fixing part 200, an extended nozzle part 300, a spray nozzle part 400, and a driving part 500.

The nozzle cover 100 is mounted on a water supply part to which a water supply source is connected. In this case, a nozzle coupling part may be installed at one outer surface of the nozzle cover 100 so that each nozzle is coupled.

Accordingly, it is possible to prevent the nozzles from getting tangled, to see the positions and roles of the nozzles (the functions can be determined through color, shape, and coupling positional relationship), and to quickly and simply replace nozzles that are damaged (due to breakage, contamination with rust, etc.).

The nozzle fixing part 200 is coupled to the inside of the nozzle cover 100. In addition, the nozzle fixing part 200 is formed with an incision groove 210 in which a part of a surface is incised along a vertical length.

In this case, the incision groove 210 may be formed with a first fixing groove (not shown), so that a moving protrusion 410 is able to fix the extended nozzle part 300 withdrawn from the nozzle fixing part 200.

In addition, the incision groove 210 may be formed with a second fixing groove (not shown), so that the moving protrusion 410 is able to fix the spray nozzle part 400 withdrawn from the extended nozzle part 300.

In addition, the nozzle fixing part 200 may include a fixing member 220. The fixing member 220 may be formed with a groove corresponding to the incision groove 210 and fix the extended nozzle part 300 and the spray nozzle part 400.

The fixing member 220 may further include a first fixing member 221 and a second fixing member 222. Here, a lower end of the extended nozzle part 300 may be coupled to the first fixing member 221. Also, a loser end of the spray nozzle part 400 may be coupled to the second fixing member 222.

In addition, in the first fixing member 221, a coupling protrusion may be formed so as to be engaged with and coupled to the inside of the second fixing member 222, and a protruding protrusion 402 protruding from a lower surface of the spray nozzle part 400 toward the extended nozzle part 300 may be inserted into a corresponding groove corresponding to the protruding protrusion 402.

In addition, the second fixing member 222 may be formed with an insertion hole **222*a* into which the coupling protrusion is inserted, and a lower end of the spray nozzle may be inserted into a groove formed in an outer circumference of the second fixing member 222**.

The extended nozzle part 300 is slidably coupled to the inside of the nozzle fixing part 200, and simultaneously communicates with a base end of the nozzle cover 100 and a front end of the nozzle cover 100.

In addition, the extended nozzle part 300 may be formed with a corresponding incision groove 310 corresponding to the incision groove 210 of the nozzle fixing part 200, and the extended nozzle part 300 may include a sliding protrusion 320 formed in a lower end of an outer circumference of the extended nozzle part 300 and capable of moving in a sliding manner.

The spray nozzle part 400 is coupled to the inside of the extended nozzle part 300 to be slidably movable toward an upper end of the extended nozzle part 300, and a nozzle connected to a water supply part is coupled to the spray nozzle part 400, so that at least one spray hole 401 is formed to spray wash water to the outside of the spray nozzle part 400.

In addition, the spray nozzle part 400 may include a moving protrusion 410 protruding from the outer circumferential surface of the lower end of the spray nozzle part 400. In this case, the moving protrusion 410 may slide along the incision groove 210 and the corresponding incision groove 310. In addition, the moving protrusion 410 protrudes in both directions and has an elastic force, so that the moving protrusion 410 can be fitted into the first fixing groove and the second fixing groove described above.

The driving part 500 includes a wound member 510 coupled to an outside of the nozzle cover 100, the wound member 510 being rotated so as to draw and insert the extended nozzle part 300 and the spray nozzle part 400 in multiple stages.

Here, the wound member 510 has a plate spring 520 wound therein. One side of the plate spring 520 is formed with a hole 521 and coupled to the moving protrusion 410. The other side of the plate spring 520 is partially wound inside the wound member 510, so that a part of the plate spring 520 coupled to the moving protrusion 410 is wound and unwound according to driving of the driving part 500.

In addition, the driving part 500 may be used as a motor. Since the motor is a well-known technology, a detailed description thereof will be omitted.

Meanwhile, the nozzle drive device 10 for a bidet may include a flow rate regulating vale 600 coupled the water supply part to regulate a flow rate.

In this case, the flow rate regulating valve 600 is formed with a plurality of bearings. As the plurality of bearings, a coupling bearing, an elastic part, a rotation restraint, etc. may be installed.

Therefore, the nozzle drive device for a bidet 10 according to the present disclosure allows a washing nozzle to be positioned at a pressurized location when a user is seated, so that even when the user's seated position is changed, it is possible to accurately vary a location where to spray wash water. Thus, there is no cumbersome to readjust the position of the nozzle and the wash water can be sprayed accurately to the pressurized location, thereby securing accuracy.

In addition, by having the bidet nozzle and the washing nozzle have a three-stage structure so that they can be supported with a single support structure, the overall size of the bidet structure can be significantly reduced, making it easy to secure space in the toilet and at the same time facilitate installation work.

As the present disclosure may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A nozzle drive device for a bidet, the device comprising:

a nozzle cover mounted on a water supply part to which a water supply source is connected;

a nozzle fixing part coupled to an inside of the nozzle cover;

an extended nozzle part slidably coupled to an inside of the nozzle fixing part and simultaneously communicating with a base end of the nozzle cover and a front end of the nozzle cover;

a spray nozzle part coupled to the inside of the extended nozzle part to be slidably movable toward an upper end portion, and having at least one spray hole connected to the water supply part so as to spray wash water to an outside; and a driving part having a wound member coupled to an outside of the nozzle cover, the wound member being rotated so as to draw and insert the extended nozzle part and the spray nozzle part in multiple stages, wherein the nozzle fixing part is formed with an incision groove in which a part of a surface is incised along a vertical length, wherein the nozzle fixing part comprises a fixing member having a groove corresponding to the incision groove and fixing the extended nozzle part and the spray nozzle part, wherein the fixing member comprises:

a first fixing member to which a lower end of the extended nozzle part is coupled; and a second fixing member to which a lower end of the spray nozzle part is coupled, wherein the first fixing member is formed with a coupling protrusion so as to be engaged and coupled to the inside of the second fixing member, and a protruding protrusion protruding from a lower surface of the spray nozzle part toward the extended nozzle part is inserted into a corresponding groove corresponding to the protruding protrusion, wherein the second fixing member is formed with an insertion hole into which the coupling protrusion is inserted, and wherein the lower end of the spray nozzle is inserted into the groove formed in an outer circumference of the second fixing member.

2. The nozzle drive device of claim 1, further comprising:

a flow rate regulating valve coupled to the water supply part to regulate a flow rate.

3. The nozzle drive device of claim 1, wherein in the extended nozzle part, the corresponding incision groove corresponding to the incision groove of the nozzle fixing part is formed, and a sliding protrusion is provided at a lower end of an outer circumference of the extended nozzle part so as to slide along a vertical groove.

4. The nozzle drive device of claim 3, wherein the spray nozzle part comprises a moving protrusion protruding from an outer circumferential surface of the lower end of the spray nozzle part, and wherein the moving protrusion slides along the incision groove and the corresponding incision groove.

5. The nozzle drive device of claim 4, wherein the wound member has a plate spring wound inside, and wherein one side of the plate spring is formed with a hole so as to be coupled to the moving protrusion, and the other side of the plate spring is partly wound inside the wound member.

* * * * *